Patented June 16, 1953

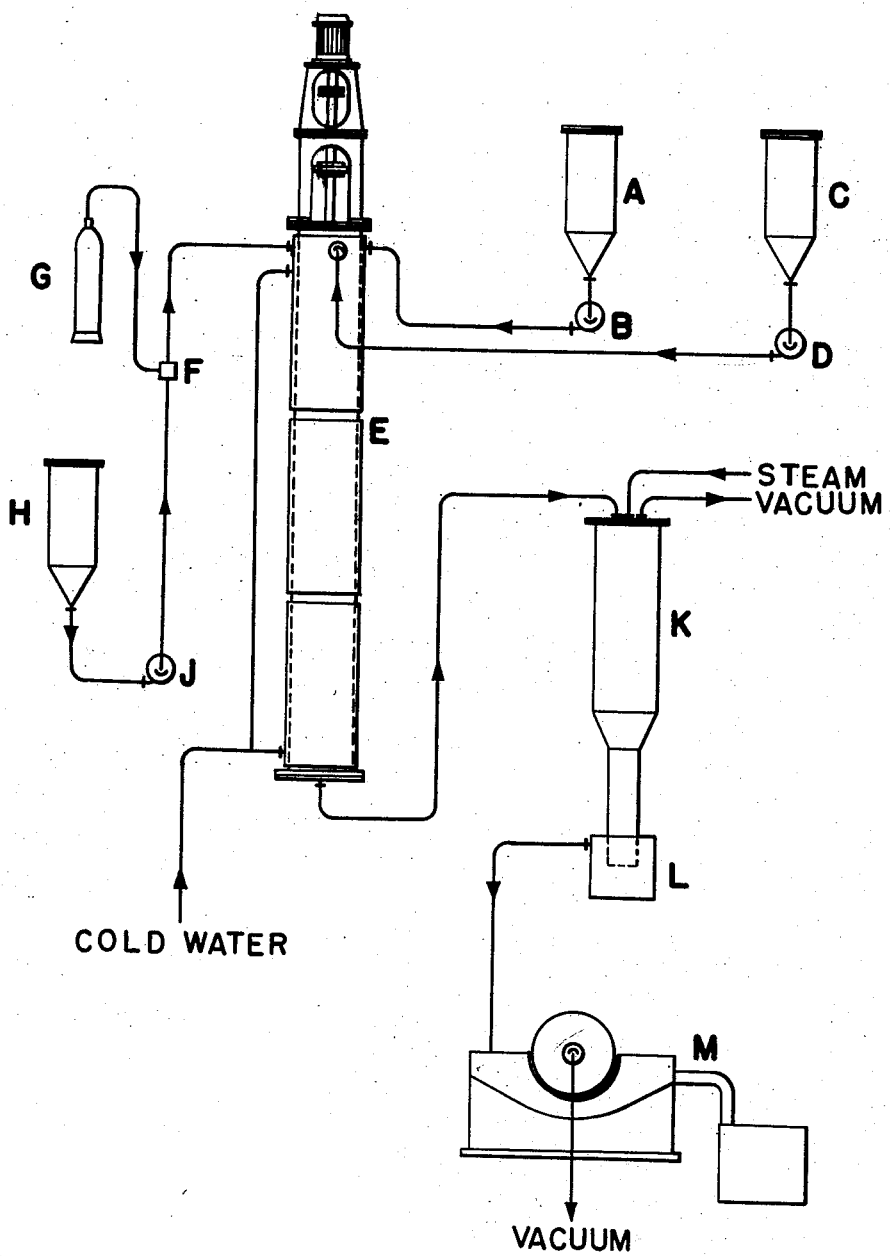

2,642,418

UNITED STATES PATENT OFFICE 2,642,418

PROCESS FOR THE PRODUCTION OF POLYACRYLIC NITRILE

Heinrich Wenning, Marl in Westphalia, Germany, assignor to Chemische Werke Huls Gesellschaft mit beschränkter Haftung, Kreis Recklinghausen, Germany, a corporation of Germany Application November 9, 1951, Serial No. 255,567
In Germany November 13, 1950

2 Claims. (Cl. 260—88.7)

It is known that the spinning of polyacrylic nitrile by the dry spinning process, using solutions of the polyacrylic nitrile in dimethyl foramide or other solvents, gives high grade filaments only when the solutions are free of undissolved, merely swelled particles of polyacrylic nitrile of higher molecular weight. It is technically very difficult to free solutions of polyacrylic nitrile from such swelled but undissolved or incompletely dissolved particles. On the other hand, the presence of lower polyacrylic nitriles is objectionable because they give brittle filaments with low elasticity and inferior strength. These difficulties indicate the desirability of polymerizates of the most uniform molecular size.

Polyacrylic nitrile can be prepared by polymerization of the monomeric acrylic nitrile in aqueous dispersion in the presence of water soluble redox catalysts. By redox catalysts are understood, for example, mixtures of water soluble inorganic oxidizing agents, such as alkali metal persulfates, alkali metal perborates, alkali metal perphosphates, alkali metal percarbonates, hydrogen peroxide, etc., on the one hand, and water soluble inorganic reducing agents, such as alkali metal bisulfites, alkali metal hyposulfites and alkali metal sulfoxylates.

The redox catalyst consisting of about 1 to 3 parts by weight of a water soluble inorganic oxidizing agent and about 1 to 6 parts by weight of a water soluble inorganic reducing agent is used in quantity amounting to from about 0.1 to about 1.5% by weight of the monomer to be polymerized. In this known method one works with a fixed ratio of one part by weight of acrylic nitrile to about 5 to 15 parts by weight of water and adjusts the hydrogen ion concentration to from about pH 2.5 to about pH 3.5 by addition of a mineral acid such as phosphoric acid, sulfuric acid, or hydrochloric acid. To maintain a constant hydrogen ion concentration during the polymerization of the acrylic nitrile in order to produce a polyacrylic nitrile with the most uniform molecular size there is required either a large quantity of mineral acid which gives rise to the danger of saponification of the monomeric or polymeric acrylic nitrile, or the use of buffering electrolytes, for example, secondary sodium phosphate or sodium acetate.

The present invention concerns a procedure for the production of a polyacrylic nitrile of very uniform molecular weight, which can be processed from volatile organic solvents, such as dimethyl formamide, into shaped objects, particularly by the dry spinning process into high grade textile filaments.

It has been found that one obtains polyacrylic nitrile of very uniform molecular size, which is particularly well suited for the production of high grade filaments by the dry spinning process, if one polymerizes the monomeric acrylic nitrile in aqueous dispersion in the presence of water soluble inorganic redox catalysts, and uses carbon dioxides as hydrogen ion donor to control the hydrogen ion concentration. By using carbon dioxide as hydrogen ion donor it is possible to regulate the hydrogen ion concentration very accurately taking into consideration the dissociation constant of the carbonic acid formed from carbon dioxide and water at the pressure and temperature maintained during the polymerization. Due to the pressure and the temperature a critical pH value of about 4.5 can never be exceeded even when an overdosing with carbon dioxide occurs. After completion of the polymerization one releases the carbon dioxide, which can be done with the aid of steam in a direct current over a cascade—if desired in vacuum—whereby the pH value of the polymerizate dispersion is displaced quickly almost into the neutral field and thus undesired further polymerization of residual, non-reacted monomers, which would usually lead to undesired lower degrees of polymerization is prevented. The polymerization can be stopped at any desired stage in the simplest manner by releasing the pressure. Whereas heretofore the neutralization of the mineral acid by means of alkali to end the polymerization required a longer time during which the polymerization proceeds further it is possible by using carbon dioxide as hydrogen ion donor, to remove the carbon dioxide by pressure release almost completely and instantaneously. Thus the polymerization is brought to a standstill immediately. Moreover a polymerizate is obtained, which aside from the small quantity of redox catalyst contains no electrolytes, as in the case in the polymerization carried out with the addition of strong mineral acids, which must subsequently be neutralized. The process can be carried out discontinuously or continuously as is evident from the following example.

The accompanying drawing illustrates an apparatus suitable for carrying out the process. From the container A an aqueous potassium persulfate solution is led through the pump B, and from the container C an aqueous sodium bisulfite solution is led through the pump D, to the container E, which is made of stainless steel for an operating pressure of 10 atmospheres absolute pressure. Container E is provided with a cooling jacket and a stirrer. From the container G carbon dioxide is led through the valve F, and from the container H water and acrylic nitrile are led through the pump J to the container E. The polymerizate dispersion formed in container E is delivered from the lower part thereof into the pressure release container K which is under reduced pressure and into which steam is introduced. The polymerization dispersion flows through the barometric outlet L to the filter M which is under reduced pressure.

*Example*

Into the top of a vertically disposed container 5 m. long with a diameter of 0.5 m., which is provided with a cooling jacket and stirrer, are introduced continuously at the rate of 111.7 kg. per hour a solution which contains 104 kg. of water, 200 gm. of carbon dioxide and 7.5 kg. of monomeric acrylic nitrile. Simultaneously 2 kg. of an aqueous solution containing 11 gm. of potassium persulfate per liter and 4.4 kg. of a solution containing 22 gm. of sodium bisulfite per liter are introduced hourly. The polymerization temperature is kept at 40–50° C., whereby a pH of about 4–4.5 and a pressure of about 5 atmospheres are maintained. The polymerization conversion is about 80% complete within 5 hours when the reaction mixture leaves the container at the bottom through a pressure-holding valve at the rate at which the reactants are introduced into the container at the top. The polymerizate dispersion is treated in the vacuum with steam, whereby the carbonic acid and the non-reacted monomeric acrylic nitrile are removed and an aqueous practically electrolyte-free polyacrylic nitrile dispersion with a pH of 6.0–6.5 is discharged from the apparatus which is under vacuum. The dispersion obtained is, if so desired, sprayed after filtration and redispersion in water, into a stream of hot air. The polyacrylic nitrile obtained dissolves very easily in dimethyl formamide. A 20–24% solution has a viscosity of about 80–100 poise, which by dry spinning gives threads with a strength of 35–40 Rkm at elongations of 16–22%.

If one wishes to carry out the process discontinuously, which in general is however less advantageous, one polymerizes a charge consisting of water saturated with carbon dioxide and acrylic nitrile by introducing the above-mentioned redox catalyst at a temperature of 40–50° C. and at a pressure of about 5 atmospheres absolute pressure. After 5 hours the polymerization is ended by releasing the pressure and expelling the carbon dioxide, whereupon the dispersion obtained is processed in the usual way.

I claim:

1. Process for the production of polyacrylic nitrile by polymerization of acrylic nitrile in aqueous dispersion in the presence of water soluble redox catalysts, characterized in that the dispersion is maintained under superatmospheric pressure and at a pH value of about 4 to 5 solely by the presence of dissolved carbon dioxide.

2. Process as defined in claim 1 in which the polymerization is interrupted by releasing the pressure and thus expelling the carbon dioxide.

HEINRICH WENNING.

References Cited in the file of this patent

UNITED STATES PATENTS

| Number | Name | Date |
|---|---|---|
| 2,486,241 | Arnold | Oct. 25, 1949 |